Figure 1:
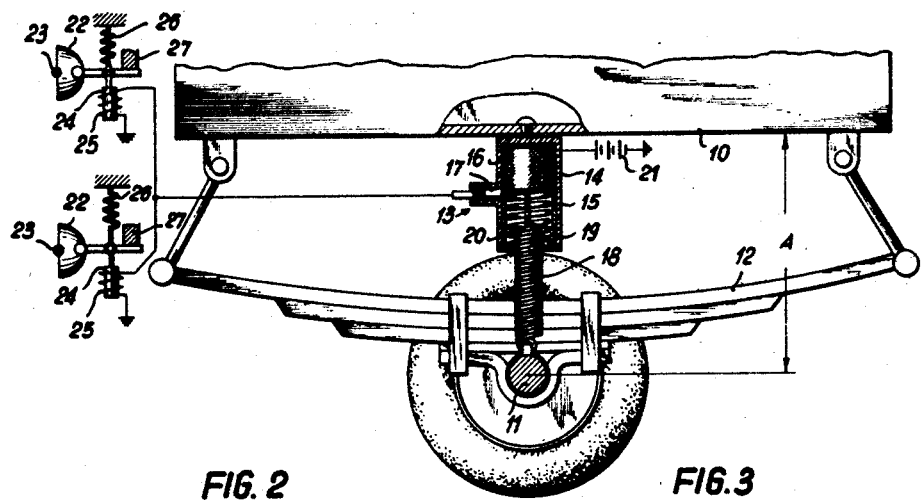

Aug. 5, 1958 R. LINDER ET AL 2,846,551
APPARATUS FOR AUTOMATICALLY ADJUSTING VEHICLE LAMPS
Filed Oct. 20, 1955 2 Sheets-Sheet 1

INVENTORS:
Rudolf Linder and
Karl Rilling
By: Michael S. Striker
agt.

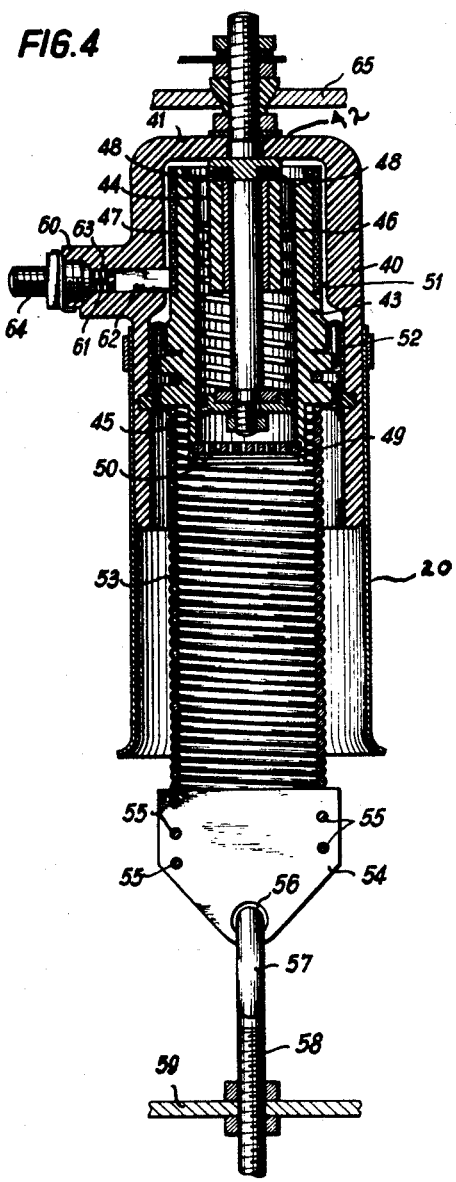

United States Patent Office 2,846,551
Patented Aug. 5, 1958

2,846,551

APPARATUS FOR AUTOMATICALLY ADJUSTING VEHICLE LAMPS

Rudolf Linder, Stuttgart-Degerloch, and Karl Rilling, Plochingen (Neckar), Germany, assignors to Robert Bosch G. m. b. H., Stuttgart, Germany Application October 20, 1955, Serial No. 541,804

11 Claims. (Cl. 201—48).

The present invention relates to an apparatus for automatically adjusting the position of vehicle lamps so that the lamps will always illuminate substantially the same distance ahead of the vehicle irrespective of changes in the load of the vehicle.

When a vehicle such as a truck or the like carries varying loads, the elevation of the load-carrying part of the vehicle, which is spring supported, changes with changes in the load, and the result is that if no adjustment of the vehicle lamps is provided the inclination of the vehicle lamps changes with the load changes to undesirably change the distance ahead of the vehicle which is illuminated by the lamps.

One of the objects of the present invention is to provide an apparatus which will automatically maintain the distance ahead of the vehicle which is illuminated substantially constant irrespective of changes in the load of the vehicle.

Another object of the present invention is to provide an apparatus of the above type which is not so sensitive that it will make adjustments with minor changes in the elevation of the load-carrying vehicle part. For example, when the vehicle goes over a bump in the road, if the adjusting apparatus is too sensitive it will change the inclination of the vehicle lamps when the vehicle goes over such a bump. With the apparatus of the present invention such undesirable adjustment of the vehicle lamps will not occur.

A further object of the present invention is to provide an automatic lamp adjusting apparatus of the above type with parts which will not rapidly wear out because of excessive unnecessary movement of the parts.

An additional object of the present invention is to provide an automatic lamp adjusting apparatus of the above type which has movable parts which move relative to each other through only a fraction of the distance that a spring supported vehicle part and a non-spring supported vehicle part move relative to each other.

Also, it is an object of the present invention to provide a structure capable of accomplishing all of the above objects and at the same time composed of simple and ruggedly constructed elements which will operate reliably for a long period of time with a minimum of maintenance.

With the above objects in view the present invention mainly consists of an apparatus for automatically adjusting the position of a vehicle lamp, this apparatus including a pair of control members which are movable relative to each other, and one of which is adapted to be connected to one of a pair of vehicle parts. These vehicle parts are respectively a spring supported vehicle part and a non-spring supported vehicle part. A spring means is operatively connected to the control members for limiting the movement thereof relative to each other to a fraction of the movement of the vehicle parts relative to each other, and this spring means includes a weaker spring connecting one of the control members to one of the vehicle parts, the other of the control members being connected to the other of the vehicle parts, and a stronger spring of the two springs which constitute the spring means operatively engaging the control members for urging the same to move relative to each other. This stronger spring acts in opposition to the weaker spring, and both springs are located substantially along a common axis which is also the axis along which the control members move relative to each other.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig.s 1–3 respectively illustrate schematically three different embodiments of structures according to the present invention; and Fig. 4 is a longitudinal sectional view showing the details of an actual structure according to the embodiment shown in Fig. 1.

Referring now to the drawings, Fig. 1 shows a spring supported vehicle part 10 which in this case is a part of the vehicle frame which is adapted, for example, to carry the load of the vehicle. A wheel axle 11 is shown located beneath the spring supported vehicle part 10, and this wheel axle 11 is, of course, a non-spring supported vehicle part. Leaf springs 12 are interconnected in a known way with the axle 11 and the vehicle part 10 to provide a spring support for the latter. A control apparatus 13 according to the invention is located between the spring supported part 10 and the non-spring supported part 11. This control apparatus 13 includes a control member 14 in the form of an outer cylindrical member fixed to the spring supported vehicle part 10 for movement therewith. A second control member 15 in the form of an inner cylindrical member is freely located within the outer cylindrical member 14 for movement therein, this inner cylindrical member 15 being made of an electrically non-conductive material. An electrical resistance wire 16 is helically wound about and carried by the outer cylindrical face of the inner cylindrical member 15. The outer cylindrical member 14 is provided with a hollow extension which extends radially away from the axis of the outer cylindrical member 14 and which slidably supports in its interior a contact member 17 of electrically conductive material, this contact member 17 engaging a relatively small portion of the resistance wire 16 located at the outer cylindrical face of the inner cylindrical member 15. Thus, it is apparent that as the inner cylindrical member 15 moves axially along the interior of the outer cylindrical member 14 the resistance wire 16 will move with respect to the contact member 17 which slidably engages the resistance wire. An elongated coil spring is connected at one end to the inner cylindrical member 15 and at its other end to the axle 11, this coil spring 18 being adapted to urge the inner cylindrical member 15 toward the axle 11.

Both of the cylindrical members have open bottom ends and closed top ends, and the top end of the coil spring 18 is fixed to the top end wall of the inner cylindrical member 15 in any suitable way. The outer cylindrical member 14 has at its bottom open end an inwardly extending annular flange 19 against which one end of a coil spring 20 abuts. This coil spring 20 extends along the interior of the inner cylindrical member 15 and engages the top end wall thereof. The coil spring 20 is under compression and acts in opposition to the coil spring 18, this coil spring 18 being weaker than the coil spring 20. When the coil spring 18 is unstressed the spring 20 has a predetermined stress therein. It will be noted that the inner and outer cylindrical members 15 and 14, respectively, are movable relative to each other along a common axis, and furthermore the coil springs 18 and 20 are located substantially along this common axis. The resistance wire has one end connected electrically to one pole of a battery 21 the other pole of which is grounded, as indicated in Fig. 1.

At the front of the vehicle are located a pair of lamps 22 which are supported in any suitable way for turning movement about a common horizontal axis 23. Each of the lamps 22 carries an armature 24 of a solenoid which includes a coil 25 located about the armature, grounded at one end, and electrically connected at its other end to the contact member 17. Springs 26 are respectively connected to the armatures 24 to urge the latter in a direction opposite to the direction in which the armatures 24 are urged when the solenoids are energized. Stops 27 respectively engage the lamp extensions which carry the armatures 24 to limit the turning of the lamps 22 in a counterclockwise direction, as viewed in Fig. 1. Thus, the stops 27 determine the position of the lamps when the springs 26 act on the lamps without being opposed by the solenoids.

The above described structure operates as follows:

In the position of the parts shown in Fig. 1 the vehicle is fully loaded and the lamps 22 illuminate a predetermined distance ahead of the vehicle. At this time the bottom surface of the spring supported part 10 of the vehicle is located at a distance A from the axis of the axle 11, as shown in Fig. 1, this axle 11 being the rear axle of the vehicle in the example shown. Assuming now that the vehicle is unloaded to an appreciable extent, it is evident that the springs 12 will raise the rear end of the vehicle so that the lamps 22 tend to become inclined downwardly and tend to illuminate a shorter distance ahead of the vehicle. With the structure of the present invention, however, the raising of the spring supported part 10 of the vehicle causes the control member 14 to move upwardly therewith, and this results in operation of the control apparatus. As the outer cylindrical member 14 moves upwardly the compression of the spring 20 is increased and this spring 20 acts with an increasing force on the control member 15 to tension the spring 18. After a predetermined extent of movement of the parts, the spring 18 is tensioned sufficiently to overcome the force of the spring 20 and causes the inner control member 15 to move downwardly relative to the outer control member 14 against the action of the spring 20. When such movement of control members 14 and 15 relative to each other takes place, the contact 17 and resistance wire 16 move relative to each other and as a result the amount of resistance provided by the wire 16 diminishes in proportion to the downward movement of the inner control member 15 relative to the outer control member 14. As a result, the electromagnets 24, 25 are energized to an increasing extent and the lamps 22 are turned in opposition to the springs 26 also to an increasing extent. By proper choice of the sizes of the springs 18 and 20 it is possible to obtain an adjustment of the lamps 22 which provides the same distance of illumination irrespective of load changes. The spring 18, in addition to providing the stepless lamp regulation described above, produces the result of preventing the apparatus from being influenced by jarring of the vehicle as when the vehicle travels over bumps or other road irregularities.

Figure 2:
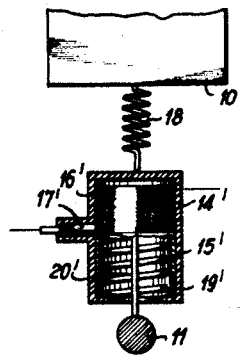

Fig. 2 shows an embodiment of the invention which differs from that of Fig. 1 only in that the control member 14' which corresponds to the control member 14 is connected by the tension spring 18', which corresponds to the spring 18, to the spring supported vehicle part 10, while the other control member 15', which corresponds to the control member 15, is fixedly connected to the non-spring supported vehicle part 11 in the manner schematically shown in Fig. 2. The remaining parts shown in Fig. 2 correspond to the parts shown in Fig. 1 and are indicated with the some reference characters primed. It is evident that as the load of the vehicle decreases with the embodiment of Fig. 2 the upwardly moving spring supported part 10 of the vehicle will gradually increase the tension of the spring 18' to eventually cause the outer cylindrical member 14' to move upwardly against the influence of the spring 20' in order to provide movement of the resistance winding 16' with respect to the contact 17' to reproduce the same results as are produced with the embodiment of Fig. 1.

Figure 3:
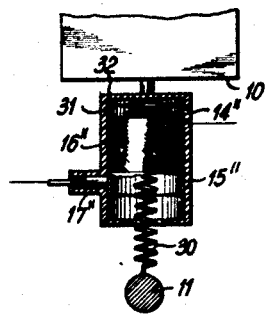

According to the embodiment of the invention illustrated diagrammatically in Fig. 3, a pair of springs which are under compression serve as the spring means for limiting the movement of the control members to a fraction of the movement of the spring supported vehicle part and non-spring supported vehicle part relative to each other. It will be noted that this latter feature is characteristic of the present invention. Thus, referring to Fig. 1, it will be seen that because the relative movement of control members 14 and 15 relative to each other does not take place until the spring 18 is tensioned sufficiently to overcome the force of the spring 20, the parts 14 and 15 move relative to each other through only a fraction of the distance that the spring supported part 10 and non-spring supported part 11 move relative to each other. This same result is obtained with the springs 30 and 31 of Fig. 3 both of which are under compression and which have different strengths as is the case with the embodiments of Figs. 1 and 2 where the springs 20 and 20' are respectively stronger than the springs 18 and 18'. The weaker spring 30 of Fig. 3 is connected to the non-spring supported axle 11 of the vehicle and bears against the inner cylindrical member 15" to urge the latter upwardly away from the axle 11, as viewed in Fig. 3. The other stronger spring 31 is compressed between the end walls of the outer cylindrical member 14" and the inner cylindrical member 15" to urge this latter control member downwardly against the force of the spring 30. The outer cylindrical member 14" is fixed directly to the spring supported vehicle part 10. In the same way as with the above described embodiments, the inner cylindrical member 15" carries a resistance wire 16" which is helically wound about the outer cylindrical face of the inner cylindrical member 15", and an electrically conductive contact member 17" engages the resistance wire 16" in the same way as with the above described embodiments, all of the remaining structure of the embodiment of Fig. 3 being identical with that of Fig. 1. It will be evident that with the embodiment of Fig. 3, as the vehicle becomes unloaded the spring supported part 10 will move upwardly to carry the control members 14' and 15' upwardly until the equilibrium between the springs 30 and 31 is disturbed sufficiently to enable the spring 31 to move the inner cylindrical member 15" downwardly with respect to the outer cylindrical member 14" to produce the same results as with the embodiment of Fig. 1.

Fig. 4 of the drawings illustrates the details of a practical embodiment of the invention which corresponds to the embodiment schematically illustrated in Fig. 1. The outer cylindrical control member is in the form of a cylinder 40 made of an electrically non-conductive material and having an end wall 41. An electrically conductive guide pin 42 is fixed to the end wall 41 and extends axially along the interior of the outer cylindrical member 40. This guide pin 42 extends along the interior of the outer cylindrical member 40 up to a point which is located almost at the bottom end of the inner cylindrical member 43 which is located within the outer cylindrical member 40 and which is also made up of an electrically non-conductive material. Furthermore the guide pin 42 has a free end portion extending outwardly beyond the end wall 41 of the cylindrical housing 40 and being threaded as indicated in Fig. 4. The inner cylindrical member 43 is formed with an axial bore in its central hub portion 44, and the guide pin 42 extends slidably through this axial bore which may be provided with a bearing sleeve, as shown, so that in this way the guide pin 42 guides the inner cylindrical member 43 for axial movement along the interior of the outer cylindrical member 40. At the inner free end of the guide pin 42, the latter removably carries a plate 45 which extends transversely to the axis of the guide pin and which may be removably connected to the guide pin through any suitable means such as the nut shown in Fig. 4 in threaded engagement with the bottom free end of the guide pin 42. Thus, it is an easy matter to remove the plate 45 when desired. A coil spring 46 is coiled about the guide pin 42, abuts at one end against the plate 45, and abuts at its other end against the inner surface of the top wall of the hollow inner cylindrical control member 43. When the inner cylindrical member 43 is in its upper end position shown in Fig. 4 the coil spring 46 is compressed to a predetermined extent.

A resistance wire 47 is wound about an outer cylindrical face portion of the inner cylindrical member 43, and one end of this resistance wire 47 is connected with the coil spring 46 which is electrically conductive. Also the plate 45 and guide pin 42 are electrically conductive, so that in this way the guide pin 42, the plate 45, and the spring 46 serve to electrically interconnect the outer threaded portion of the guide pin 42 with the resistance wire 47. The top end wall of the inner cylindrical member 43 is formed with axial bores 48 through one of which the end of the resistance wire 47 extends to be connected to the spring 46. It is evident that as the inner cylindrical member 43 moves axially along the guide pin 42, air will tend to move in and out of the interior of the hollow inner cylindrical member 43, and the construction of Fig. 4 includes a plate 49 carried by and extending across the bottom end portion of the hollow cylindrical member 43 and formed with a plurality of relatively fine apertures 50 which serve to throttle the air flow into and out of the interior of the hollow cylindrical member 43. An annular gap 51 is provided between the inner and outer cylindrical members, and a flexible membrane 52 is fixed at its outer periphery to the outer cylindrical member 40 and at its inner periphery to the inner cylindrical member 43, in the manner shown in Fig. 4, to seal the annular gap 51 against the outer atmosphere, so that foreign matter cannot enter into this annular gap and so that this gap 51 also may be kept free of dampness. At its bottom end portion which extends downwardly beyond the membrane 52, the inner cylindrical member 43 is formed in its outer face with a helical groove into which some of the end convolutions of the spring 53 may be turned in order to connect the spring 53 in an adjustable manner to the inner cylindrical member 43. The other end of the spring 53 is connected to a plate 54 which serves as a member for interconnecting the spring 53 with a vehicle part 59. The plate 54 is formed with openings 55 through which some of the convolutions of the spring 53 pass, in the manner shown in Fig. 4, so that the plate 54 forms a member for adjustably interconnecting the spring 53 with a part of the vehicle. The actual connection of the plate 54 to the vehicle part 59 takes place through a threaded member 58 threadedly engaging the part 59 as well as a pair of lock nuts and having at its top end an eye portion 57 which passes through an opening 56 in plate 54, in the manner shown in Fig. 4.

The outer cylindrical member 40 of electrically non-conductive material is provided with a projection 60 which is bored radially to the axis of the cylindrical member 40 and which slidably supports in its interior an electrically conductive contact member 62 which engages the resistance wire 47 and which is urged by the spring 61 toward the resistance wire 47. The contact member 62 is electrically connected with a threaded member 64 which carries conventional elements for electrically connecting an electrical lead to the elements 64 which through its electrical connection with the element 62 serves to form part of the circuit shown diagrammatically in Fig. 1. The upper portion of the guide pin 42 which extends beyond the wall 41 is connected through suitable insulating material with the vehicle part 65 shown in Fig. 4, this part 65 corresponding to the spring supported vehicle part, while the part 59 corresponds to the non-spring supported vehicle part, this part 59 being, for example, a bearing housing or the like which is associated with the rear axle of the vehicle. The top free end portion of the guide pin 42 serves as an electrical connecting element in order to provide an electrical circuit through the guide pin and the remaining elements of Fig. 4 as described above.

The springs 46 and 53 have such a size that the spring 46 has a greater spring constant than the spring 53. The spring constant of the spring 53 can be changed in a very simple way, however, by turning more or less of its convolutions through the openings 55 of the plate 54, so that the movement of the spring supported vehicle part can have a proper relationship to the movement of the control members 40 and 43 with respect to each other.

As the inner cylindrical member 43 moves axially within the outer cylindrical member 40, the air is throttled through the openings 50 so that in this way an effective air damping is provided in order to reduce in this way also the influence of jarring of the vehicle or movement of the vehicle over uneven roads on the apparatus of the invention. With the membrane 52 the effective operation of the parts is greatly increased.

A further advantage of the structure of the invention is that it is a very simple matter to adapt the size of the parts to vehicles of different sizes.

It will be understood that each of the elements described above, or two or more together, may also find a useful application in other types of lamp adjusting apparatus differing from the types described above.

While the invention has been illustrated and described as embodied in automatic vehicle lamp adjusting apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. For use in an apparatus for automatically adjusting the position of a vehicle lamp on a vehicle having a spring supported part and a non-spring supported part, in combination, a first control member adapted to be connected to one of the vehicle parts for movement therewith; a second control member movable relative to said first control member; a first spring connected to said second control member and adapted to be connected to the other of the vehicle parts; and a second spring stronger than said first spring and acting in opposition thereto, said second spring engaging said control members for urging the same to move relative to each other, said first and second springs having different strengths which limits movement of said control members relative to each other to a fraction of the movement of said vehicle parts relative to each other.

2. For use in an apparatus for controlling the position of a lamp of a vehicle having a spring supported part and a non-spring supported part, in combination, a pair of control members movable relative to each other along a common axis, one of said control members adapted to be connected to one of the vehicle parts; a first spring connected to the other of said control members and adapted to be connected to the other of said vehicle parts, said first spring being in the form of a coil spring extending along said axis; and a second spring stronger than said first spring and acting in oposition thereto, said second spring engaging said control members for urging the same to move relative to each other and said first and second springs and having different strengths such that said control members move relative to each other through a fraction of the movement of the vehicle parts relative to each other.

3. For use in an apparatus for controlling the position of a lamp of a vehicle having a spring supported part and a non-spring supported part, in combination, a pair of control members movable relatively to each other for actuating a mechanism to adjust a position of the lamp, one of said control members being adapted to be connected to one of the vehicle parts; a first spring connected to the other of said control members and adapted to be connected to the other of the vehicle parts for urging said other control member to move relative to said other vehicle part; and a second spring stronger than said first spring and operatively engaging said control members for urging the same to move relative to each other, said second spring acting in opposition to said first spring, being substantially coaxial with said first spring, and being in the form of a coil spring which is maintained under compression by said control members.

4. For use in an apparatus for controlling the position of a lamp of a vehicle having a spring supported part and a non-spring supported part, in combination, a pair of control members movable relative to each other for actuating a mechanism for adjusting the position of the lamp, one of said control members being adapted to be connected to one of the vehicle parts for movement therewith; a first spring connected to the other of said control members and adapted to be connected to the other of the vehicle parts for urging said other control member to move relative to said other vehicle part; and a second spring operatively engaging both said control members for urging the same to move relative to each other, said second spring acting in opposition to said first spring, being stronger than the same, and being stressed when said first spring is unstressed.

5. For use in an apparatus for controlling the position of a lamp of a vehicle having a spring supported part and a non-spring supported part, in combination, a pair of control members movable relatively to each other for actuating a mechanism for adjusting the position of the lamp, one of said members being adapted to be connected to one of the vehicle parts and said control members respectively being in the form of an outer cylindrcal member and an inner cylindrical member slidably mounted within said outer cylindrical member; a first spring connected to the other of said control members and adapted to be connected to the other of the vehicle parts for urging said other control member to move relative to the other of the vehicle parts; and a second spring stronger than said first spring, acting in opposition thereto, and operatively engaging said control members for urging the same to move relative to each other.

6. For use in an apparatus for controlling the position of a lamp of a vehicle having a spring supported part and a non-spring supported part, in combination, a pair of control members movable relative to each other for actuating a mechanism for adjusting the position of the lamp, one of said control members being adapted to be connected to one of the vehicle parts for movement therewith, and said control members respectively being in the form of an outer cylindrical member and an inner cylindrical member slidably mounted within said outer cylindrical member, at least one of said cylindrical members being made of an electrically non-conductive material; a first spring operatively connected to the other of said control members and adapted to be connected to the other of the vehicle parts; and a second spring acting in opposition to said first spring, being stronger than the same, and operatively engaging both of said control members for urging the same to move relatively to each other.

7. For use in an apparatus for controlling the position of a vehicle lamp, in combination, an inner cylindrical member; a resistance wire wound about and engaging the outer cylindrical face of said inner cylindrical member; an outer cylindrical member in which said inner cylindrical member is located and having an inner cylindrical face directed towards said resistance wire, said outer cylindrical member having a wall portion formed with a bore passing therethrough and located opposite a relatively small portion of said outer face of said inner cylindrical member; an electrically conductive contact member located in said bore of said outer cylindrical member and engaging a relatively small portion of said resistance wire; resilient means engaging said contact member for urging the same toward said inner cylindrical member; and spring means operatively connected to said inner and outer cylindrical members for limiting the movement thereof relative to each other to a fraction of the movement of a spring supported vehicle part and a non-spring supported vehicle part relative to each other.

8. For use in an apparatus for automatically adjusting the position of a vehicle lamp of a vehicle having a spring supported part and a non-spring supported part, in combination, an outer cylindrical member adapted to be fixed to the spring supported part of the vehicle for movement therewith; an inner cylindrical member coaxial with said outer cylindrical member, located within the same, and being axially movable relative thereto; a first spring connected to said inner cylindrical member and adapted to be connected to the non-spring supported part of the vehicle for urging said inner cylindrical member to move toward the non-spring supported part of the vehicle; a second spring stronger than said first spring and engaging both of said cylindrical members for urging said inner cylindrical member to move in said outer cylindrical member in a direction away from the non-spring supported vehicle part; and electrical means for registering the movement of said cylindrical members relative to each other.

9. For use in an apparatus for automatically controlling the position of a lamp of a vehicle having a spring supported part and a non-spring supported part, in combination, an outer cylindrical member and an inner cylindrical member located within said outer cylindrical member, said cylindrical members being axially movable relatively to each other; a first spring connected to said outer cylindrical member and adapted to be connected to the spring supported vehicle part for urging said outer cylindrical member toward said spring supported vehicle part; a second spring stronger than said first spring and engaging said cylindrical members for urging said outer cylindrical member away from the spring supported vehicle part; and means operatively connected to said inner cylindrical member for connecting the same to the non-spring supported vehicle part.

10. For use in an apparatus for automatically controlling the position of a vehicle lamp, in combination, an outer cylindrical member made of an electrically non-conductive material and having an end wall; an electrically conductive guide pin fixed to said end wall and extending axially along the interior of said outer cylindrical member; an electrically conductive plate fixed to a free end portion of said guide pin in the interior of said outer cylindrical member; a hollow inner cylindrical member also of an electrically non-conductive material located within said outer cylindrical member and being guided by said guide pin for movement along the axis thereof; an electrically conductive coil spring engaging said plate and said inner cylindrical member and located in the interior of the latter for urging said inner cylindrical member to move in one direction along said guide pin; and an electrical resistance wire coiled about and engaging the outer cylindrical face of said inner cylindrical member and connected to said coil spring so that part of an electrical circuit may be formed by said guide pin, said plate, said coil spring, and said wire.

11. For use in an arrangement of the character described in combination, a sprung vehicle part; an unsprung vehicle part; a first control member connected to one of said vehicle parts; a second control member movable relative to said first control member and adapted to cooperate therewith; first spring means arranged between said second control member and the other of said vehicle parts; and second spring means arranged between said second control member and said one vehicle part, said second spring means being stronger than said first spring means and acting in opposition thereto, whereby movement of said vehicle parts relative to each other will result in a relative movement between said control members which amounts to a fraction of the movement of the vehicle parts.

References Cited in the file of this patent

UNITED STATES PATENTS

| | | |
|---|---|---|
| 1,851,978 | Dinger | Apr. 5, 1932 |
| 1,967,515 | Ricker | July 24, 1934 |
| 2,256,473 | De Giers | Sept. 23, 1941 |
| 2,746,289 | Cline | May 22, 1956 |

FOREIGN PATENTS

| | | |
|---|---|---|
| 695,755 | Great Britain | Aug. 19, 1953 |